United States Patent
Devor et al.

(10) Patent No.: US 7,493,599 B2
(45) Date of Patent: Feb. 17, 2009

(54) DEVICE, SYSTEM AND METHOD FOR DETECTION AND HANDLING OF MISALIGNED DATA ACCESS

(75) Inventors: Harold Theodore Devor, Zichron Yaakov (IL); Orna Etzion, Haifa (IL); Jian Ping Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 10/721,879

(22) Filed: Nov. 26, 2003

(65) Prior Publication Data

US 2005/0114845 A1    May 26, 2005

(51) Int. Cl.
G06F 9/45    (2006.01)
(52) U.S. Cl. ..................................... 717/130
(58) Field of Classification Search ................. 717/130; 712/130
See application file for complete search history.

(56) References Cited

U.S. PATENT DOCUMENTS

| | | | | |
|---|---|---|---|---|
| 5,193,180 A | * | 3/1993 | Hastings | 717/163 |
| 5,265,254 A | * | 11/1993 | Blasciak et al. | 717/130 |
| 5,754,812 A | | 5/1998 | Favor et al. | |
| 6,064,815 A | * | 5/2000 | Hohensee et al. | 717/138 |
| 6,289,428 B1 | | 9/2001 | Derrick et al. | |
| 6,643,842 B2 | * | 11/2003 | Angel et al. | 717/130 |

OTHER PUBLICATIONS

Drongowski, Paul. "Performance Tips for Alpha Linux C Programmers". Mar. 8, 2001, pp. 9-13. Obtained from: http://opensource.hp.com/the_source/technical_papers/pauls-tips.htm.*
Rosenberg, Jerry M. "Dictionary of Computers, Information Processing, and Telecommunications". John Wiley & Sons, 2nd Edition. 1987. p. 300.*
Hookway, R., and Herdeg, Mark A., "Digital FXl32: Combining Emulation and Binary Translation". Digital Technical Journal, vol. 9, No. 1, 1997. pp. 3-12.
Baraz, et al., "IA-32 Execution Layer: a two-phase dynamic translator designed to support IA-32 applications on Itanium®-based systems". Proceedings of the 36th International Symposium on Microartichecture (MICRO-36 2003).
International Search Report for PCT/US2004/035246, mailed on Feb. 18, 2005.

* cited by examiner

Primary Examiner—Eddie P Chan
Assistant Examiner—Robert E Fennema
(74) Attorney, Agent, or Firm—Pearl Cohen Zedek Latzer, LLP

(57) ABSTRACT

Device, system and method for detection and handling of misaligned data access. A method may include, for example, detecting misaligned data access resulting from execution of a code block translated from a first format suitable for a first computing platform to a second format suitable for a second computing platform, and modifying said code block according to said misaligned data access.

27 Claims, 2 Drawing Sheets

DEVICE, SYSTEM AND METHOD FOR DETECTION AND HANDLING OF MISALIGNED DATA ACCESS

BACKGROUND OF THE INVENTION

In the field of computing platforms, a software application may be originally written to be executed by a first computing platform, for example, a 32-bit based computing platform, e.g., Intel (RTM) Architecture 32 (IA-32). In some cases, it may be possible to execute the software application on a second computing platform, for example, a 64-bit based computing platform, e.g., Intel (RTM) Itanium (RTM) processor, using suitable hardware and/or software to translate and execute the software application.

During translation or execution of the software application on the second computing platform misaligned data access and problems associated with data misalignment may occur. Data misalignment may include, for example, a data item residing at a memory address that may not be efficiently accessed by a processor. Undesired overhead, e.g., additional processing cycles or processing time, may be required when the second computing platform attempts to accesses a misaligned data item. In some cases, execution of a software application on the second computing platform may compound and intensify existing performance problems, e.g., due to data misalignment, that are also experienced when the software application is executed by the first (i.e., the original) computing platform. This may significantly decrease performance speed and may significantly increase processing time and/or the number of processing cycles. Furthermore, in some cases, a misaligned data access event may be treated as an error by an application or by an operating system, e.g., running on the second computing platform, as an error, and may consequently cause early termination of an application or other undesired results.

Data misalignment access problems may be partially mitigated using a relatively long code sequence to replace each instruction that may result in a misaligned data access event. However, bulk application of such long code sequences to prevent all data misalignment access problems may be inefficient and may incur significant overhead, e.g., additional processing cycles and/or processing time.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
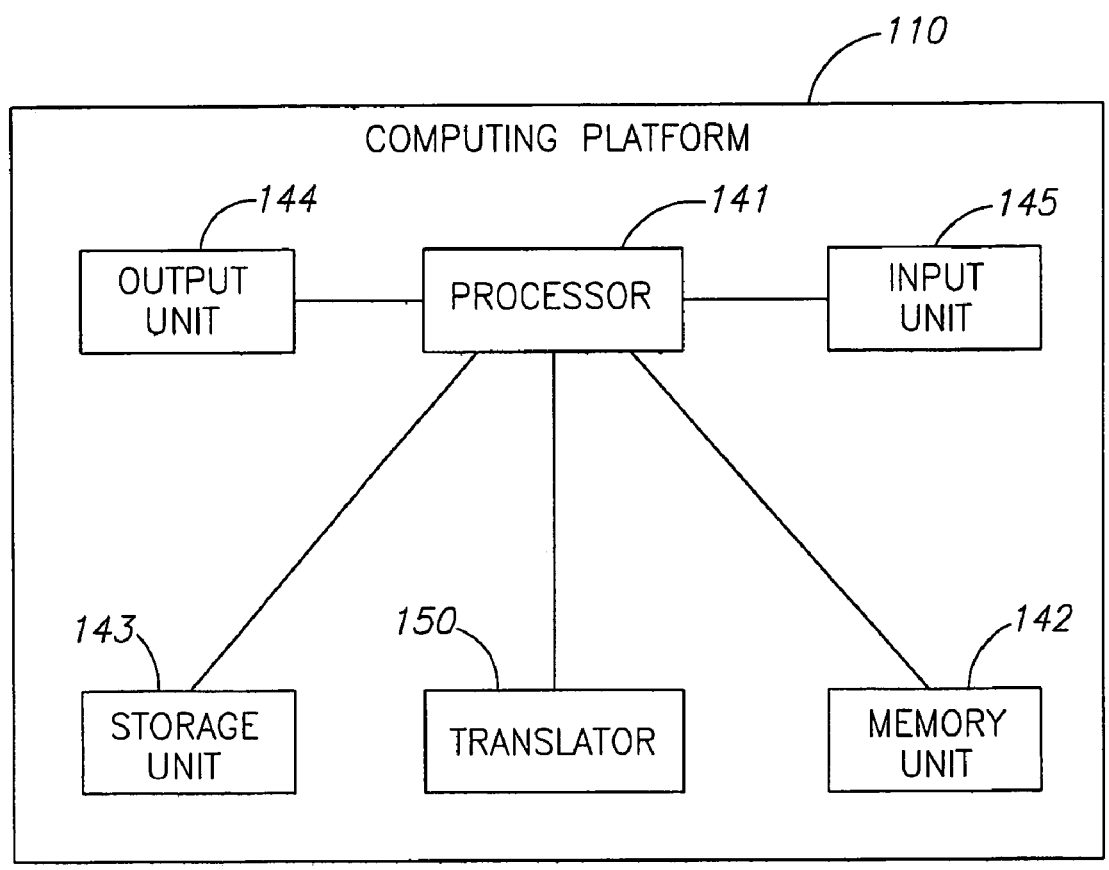
FIG. 1 is a schematic illustration of a computing platform capable of detecting and handling data misalignment, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

FIG. 1 schematically illustrates a computing platform 110 capable of detecting and handling data misalignment, in accordance with exemplary embodiments of the invention. Computing platform 110 may be used, for example, for data processing or for execution of various software applications, and may implement detection and/or handling of misaligned data access in accordance with some embodiments of the invention. Computing platform 110 may include a computing device. For example, computing platform 110 may include at least part of a personal computer, a desktop computer, a mobile computer, a laptop computer, a notebook computer, a terminal, a workstation, a server computer, a Personal Digital Assistant (PDA) device, a tablet computer, a specialized or dedicated computing device, a network device, or the like. Computing platform 110 may be implemented using any suitable combination of hardware components and/or software components.

In the example shown in FIG. 1, computing platform 110 may include, for example, one or more processors 141, one or more memory units 142, one or more storage units 143, an output unit 144, and an input unit 145. Computing platform 110 may include other suitable components or sets of components, as are known in the art, which may be operably associated with one or more components of computing platform 110.

Processor 141 may include, for example, a Central Processing Unit (CPU), a Digital Signal Processor (DSP), one or more controllers, or any suitable specific and/or general and/or multi-purpose processor or micro-processor or controller. Memory unit 142 may include, for example, a Random Access Memory (RAM), a Read Only Memory (ROM), a Dynamic RAM (DRAM), a Synchronous DRAM (SDRAM), or other suitable memory units. Storage unit 143 may include, for example, a hard disk drive, a floppy disk drive, a Compact Disk (CD) drive, a CD-ROM drive, or other suitable removable or non-removable storage units or memory modules. Output unit 144 may include, for example, one or more cards, adapters, connectors and/or components able to connect to or communicate with a monitor. Input unit 145 may include, for example, one or more cards, adapters, connectors and/or components able to connect to or communicate with a keyboard, a mouse, or a touch-pad. Memory unit 142, storage unit 143, output unit 144 and/or input unit 145 may be operably associated with processor 141. It is noted that processor 141, memory unit 142, storage unit 143, output unit 144 and/or input unit 145 may include other suitable components and/or implementations as is known in the art.

In some embodiments, software may be stored, for example, in storage unit 143 or memory unit 142, and may be executed using processor 141. Such software may include, for example, one or more operating systems, for example, Microsoft Windows, Linux, Unix, Apple OS, Solaris, Sun-OS, HP-UX, or other suitable operating systems. The software may further include one or more software applications, one or more drivers, compilers, interpreters, emulators, execution layers, software environments, managed software environment, translation layers, and/or various other suitable software components. The software may include, for example, software components, software applications and/or software layers implementing or using one or more methods in accordance with embodiments of the invention, and/or other suitable software components. In some embodiments, the software and/or memory unit 142 may include one or more misaligned data items, e.g., a data item residing at a memory address in memory unit 142 that may not be efficiently accessed by processor 141.

In some embodiments, computing platform 110 may optionally include a translator 150, which may be implemented using any suitable combination of software components and/or hardware components. For example, in one embodiment, translator 150 may include software and/or instructions stored in memory unit 142 and/or in storage unit 143, which may be run or executed using processor 141. In some embodiments, translator 150 may translate and/or convert a software application or one or more instructions from a first format adapted to a first computing platform to a second format adapted to a second computing platform, e.g., adapted to computing platform 110. In one embodiment, translator 150 may be implemented, for example, using a dedicated software layer, e.g., an execution layer. In some embodiments, translator 150 may include one or more modules or components (not shown), to perform one or more operations of detecting and handling misaligned data access in accordance with embodiments of the invention, for example, a detection module, an instrumentation module, a light instrumentation module, a heavy instrumentation module, a translation module, a re-translation module, an optimization module, a code modification module, a code classification module, or the like.

In some embodiments, translator 150 may detect and/or handle data misalignment as described below. For example, instructions or operations executed by or according to translator 150 may reflect a modified translation process in accordance with some embodiments of the invention, which may include modifications resulting from exemplary methods of detecting and handling data misalignment, as described below. For example, in some embodiments of the invention, translator 150 may implement a translation method or procedure that takes into account parameters related to data misalignment, as described in detail below.

Figure 2:
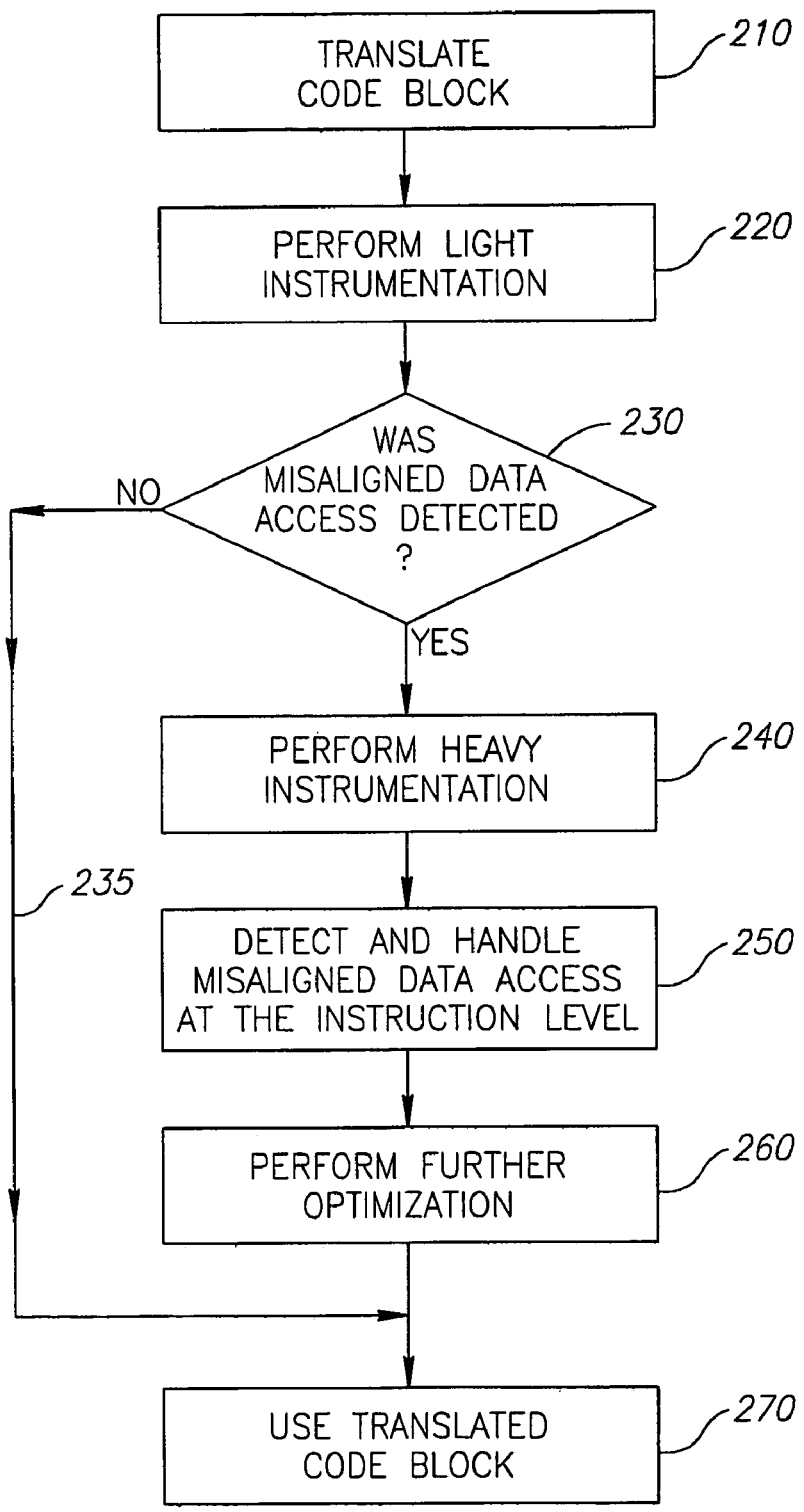
FIG. 2 is a schematic flow-chart of a method of detecting and handling data misalignment in accordance with some embodiments of the invention.

FIG. 2 schematically illustrates a flow-chart of a method of detecting and handling data misalignment in accordance with some embodiments of the invention. The method of FIG. 2, as well as methods in accordance with other embodiments of the invention, may be used, for example, with computing platform 110 of FIG. 1, by translator 150, by processor 141, by software or instructions executed by computing platform 110, and/or with various other suitable computing platforms, devices, apparatuses and/or systems. In some embodiments, the method of FIG. 2 may be used by a compiler, an interpreter and/or an emulator, which may be implemented using suitable software components and/or hardware components.

It is noted that the phrases "block of code" and/or "code block" as used herein may include, for example, one or more instructions or sets of instructions. For example, a code block may include five instructions, or 20 instructions, etc.

In accordance with some embodiments of the invention, a "hot block" may include, for example, a code block identified and/or classified as a candidate for optimization or for further optimization operations. For example, a code block that may be performed multiple times, e.g., a large number of times, during execution of a software application, may be identified and/or classified as a hot block. Other suitable criteria or conditions may be used to identify, classify, and/or define a hot block.

In accordance with some embodiments of the invention, a "cold block" may include, for example, a code block that is not identified and/or classified as a hot block. For example, a cold block may include a code block that may be performed only once or a small number of times during execution of a software application. It is noted that in some embodiments, for example, a code block may be identified and/or classified as a cold block during initial translation operations, and may be re-classified as a hot block during further translation and/or optimization operations.

As indicated at block 210, the method may translate or convert a code block of a software application, from a first format adapted to a first computing platform to a second format adapted to a second computing platform. The code block in the first format may be referred to as "original code block", and the code block in the second format may be referred to as "translated code block". In some embodiments, for example, a code block may be translated from Intel (RTM) Architecture 32 (IA-32) to Intel (RTM) Architecture 64 (IA-64). The translation may be performed, for example, using translator 150. In one embodiment, the translation may be performed using a compiler software or an interpreter software. The translation may be performed, for example, dynamically and/or in real time, e.g., substantially at or near execution time. In some embodiments, the translation may be performed in advance, e.g., ahead of execution time.

As detailed herein, embodiments of the methods of the present invention may include instrumentation operations. In accordance with some embodiments of the invention, instrumentation may include, for example, adding one or more instructions to a certain code block or to a certain instruction, in order to track, examine, debug and/or analyze the behavior or the operations of that code block or instruction.

The phrase "light instrumentation" as used herein may include, for example, instrumentation which may be performed at a level of a code block. In one embodiment, for example, "light instrumentation" may include instrumentation which may detect whether or not an execution of a code block may cause a misaligned data access, or whether or not an execution of a code block may result a misaligned data access event. In some embodiments, performing a "light instrumentation" may result in, for example, a determination whether or not an execution of a given code block includes a misaligned data access event.

The phrase "heavy instrumentation" as used herein may include, for example, instrumentation which may be performed at a level of an instruction. In one embodiment, for example, "heavy instrumentation" may include instrumentation which may detect whether or not an execution of an instruction block may cause a misaligned data access, or whether or not an execution of an instruction may result a misaligned data access event. In an alternate embodiment, "heavy instrumentation" may include, for example, instrumentation which may identify one or more instructions which execution may result a misaligned data access. In some embodiments, performing a "heavy instrumentation" may result in, for example, a determination of a location of an instruction whose execution results in a misaligned data access event.

In some embodiments, the phrase "detecting a misaligned data access" as used herein may include, for example, detecting that an execution or a subsequent execution of a translated code block includes a misaligned data access, or an access to a misaligned data item. In some embodiments, the phrase "detecting a misaligned data access" may additionally or alternatively include, for example, detecting a location of an instruction which, when executed, may result in a misaligned data access, or an access to a misaligned data item.

In some embodiments, the phrases "handling a misaligned data access", "avoiding a misaligned data access" and/or "preventing a misaligned data access" as used herein may include, for example, modifying a translated code block to create a modified translated code block, or re-translating an original code block to create a modified translated code block. In some embodiments, the modified translated code block, when executed, may access a misaligned data item more efficiently, more quickly, in a shorter time and/or using a smaller amount of processing cycles relative to a corresponding access to the misaligned data during an execution of the non-modified translated code block. In some embodiments, for example, "handling a misaligned data access", "avoiding a misaligned data access" and/or "preventing a misaligned data access" may include accessing a misaligned data item in parts, e.g., in two parts, four parts, eight parts, sixteen parts, or another suitable number of parts, in multiple access stages, using multiple access instructions, using multiple loading instructions, using a dedicated code sequence, e.g., using Code 1 as detailed herein, or using other suitable ways in accordance with embodiments of the invention.

It is noted that in some embodiments, "handling a misaligned data access", "avoiding a misaligned data access" and/or "preventing a misaligned data access" may include, for example, other suitable ways of handling, avoiding, preventing, optimizing and/or curing a misaligned data access event. For example, in one embodiment, "handling a misaligned data access", "avoiding a misaligned data access" and/or "preventing a misaligned data access" may include curing the misalignment of a data item, e.g., by aligning the data item, moving the data item from a first memory location to a second memory location, copying the data item from a first memory location to a second memory location, or other suitable ways.

As indicated at block 220, the method may perform light instrumentation or analysis on the translated code block. In some embodiments, substantially all the instructions, or at least some of the instructions, whose execution may require misaligned data access may be lightly instrumented. The light instrumentation may include, for example, modification of one or more instructions such that the modified instruction may indicate an occurrence of a pre-defined condition or when pre-defined criteria are met. For example, in some embodiments, a signal may be produced if a misaligned data access event is detected in the translated cold block. In one embodiment, for example, the signal or indication may be provided by a detection module in translator 150 to a translation module in translator 150.

In some embodiments, a purpose or a result of the light instrumentation of block 220 may include, for example, to detect whether or not an execution of a translated code block may cause a misaligned data access event, such that further analysis and optimization operations may be applied, if required, to handle, cure, avoid or prevent a misaligned data access event. As indicated at block 230, the method may check whether a misaligned data access event was detected in the translated code block. If the check result is negative, then, as indicated by arrow 235, which leads to block 270, the translated code block may be kept and/or used. If the check result is negative, then the translated code block may be further inspected, analyzed and/or optimized, as indicated at block 240 and onward.

The further inspection, analysis and optimization may include, as indicated at block 240, heavy instrumentation or analysis of the translated code block. In some embodiments, substantially all instructions whose execution may include a misaligned data access may be heavily instrumented. The heavy instrumentation may include, for example, modification of one or more instructions such that upon a misaligned data access event, information may be provided and/or registered regarding the misaligned data access. In some embodiments, the information may include, for example, indication of the instruction or instructions in the translated code block that caused the misaligned data access. The information may include, for example, indication of a type or a property of the misaligned data access, e.g., a granularity of the misalignment. For example, in one embodiment, an 8-bit data access that results in a misaligned data access event may be heavily instrumented to indicate that the misaligned data access is of 1-byte granularity, or of 4-byte granularity. It is noted that various other properties, characteristics, attributes and/or characteristics of a misaligned data access may be identified, detected, registered and/or analyzed.

As indicated at block 250, the heavy instrumentation of block 240 may be used for detection and handling of data access misalignment at the instruction level. In some embodiments, some or all or substantially all of the instructions that have been detected to result in a misaligned data access may be regenerated, re-translated, modified, optimized and/or replaced to handle, cure, avoid and/or prevent data access misalignment, to allow a relatively more efficient access to the misaligned data item, to allow a relatively faster access to the misaligned data item, or to allow using an alternate or specific way to access the misaligned data item.

In one embodiment, the detection and handling operations indicated at block 250 may be performed, for example, during translation of a hot block. For example, a hot block may be identified, and the detection and handling operations indicated at block 250 may be performed on one or more cold blocks which may be included in the hot block.

In some embodiments, the detection and handling operations indicated at block 250 may be performed, for example, using the following pseudo-code:

```
// test bit0 to see if address is 2-byte aligned.
// Predicates p.mis and p.al set appropriately.
// Will use p.mis and p.al to predicate the following instructions
tbit p.mis,p.al = r.addr, 0
// 2-byte load if aligned
(p.al) ld2 r.val = [r.addr]
// if misaligned, load each byte separately
(p.mis) ld1 r.val = [r.addr]
(p.mis) add r.addrH = 1, r.addr
(p.mis) ld1 r.valH = [r.addrH]
// combine the separately loaded bytes
(p.mis) dep r.val = r.valH, r.val, 8, 8
```

Code 1

It is noted that Code 1 is presented for exemplary purposes only, and that embodiments of the invention are not limited in this regard; other suitable instructions, set of instructions, operations, pseudo-code or algorithm may be used in accordance with embodiments of the invention, in addition to Code 1 or instead of Code 1.

In some embodiments of the invention, for example, the detection and handling operations indicated at block 250 may use alternate codes, which may include various changes relative to Code 1. In some embodiments, for example, one or more results of earlier detection of misaligned data access events may be registered and/or tracked to enhance and/or obviate one or several consequent detections of misaligned data access events. For example, in one embodiment, the location of memory addresses for which misaligned data access is detected, e.g., during the analysis of a hot block, may be registered and/or tracked. The registration or tracking may be performed, for example, using a suitable list, tracking list, stack, lookup table, array, database, variable, register, union, or in any other suitable way. The registration, tracking and/or storage of previous detections may be performed, for example, using processor 141, memory unit 142, storage unit 143, translator 150, suitable software executed using processor 141, and/or other suitable components of computing platform 110.

In the detection and handling operations indicated at block 250, some embodiments may, for example, analyze and/or perform instrumentation on a first instruction. As a result, it may be detected, for example, that accessing a first memory address by the first instruction may result in a misaligned data access. In such case, the location of the first memory address may be registered and/or tracked, e.g., using a registry or a tracking list which may be stored, for example, in memory unit 142 and/or storage unit 143. When a second instruction needs to access a second memory address, the method of the invention may check if the location of the second memory address is identical, for the purpose of data misalignment detection, to the location of the first memory address, e.g., using the tracking list or registry stored in memory unit 142 and/or storage unit 143. A positive check result may obviate the need to analyze and/or instrument the second instruction, for example, if an analysis of the first instruction already identifies the first memory address as a cause for a misaligned data access. It is noted that in some embodiments, different memory addresses may be identical for the purpose of data misalignment detection; for example, if the difference or the distance between the first and the second memory addresses is N bytes, then the first and the second memory addresses may be identical, for the purpose of data misalignment detection, in regard to an N-byte misalignment and/or in regard to a K-byte misalignment, wherein K is a factor of N. For example, in one embodiment, a memory address L and a memory address L+8 may be identical for the purpose of detecting an 8-byte data misalignment, or for the purpose of detecting a 4-byte or a 2-byte data misalignment.

Similarly, in some embodiments, during the detection and handling operations indicated at block 250, some or all of the parameters, attributes, properties, variables, characteristics, results, checks and/or calculations used in one or more given detections of misaligned data access, may be used or re-used in a subsequent detection. For example, the two-byte load example of Code 1 may use one or more predicates that are set, determined and/or calculated in one or more previous detections or analysis of misaligned data access.

In some embodiments, performing the detection and handling operations indicated at block 250 may include, for example, using a code sequence or a set of instructions to perform a data access, e.g., when a misaligned data access is detected; the code sequence or set of instructions may be relatively long or may include a relatively large number of instructions or operations. In some embodiments, such code sequence or set of instructions may be moved to a suitable location in the software application. For example, in one embodiment, a scheduler process may move some or all of these instructions to a location external or to or remote from the translated code block, e.g., as a subroutine, a procedure, a function, or the like. During execution, instructions in the translated code block may be executed, until a "branch out" instruction is reached, at which point execution may proceed with the external or remote instructions. The external or remote instructions may include a last instruction, whose execution may result in a resumed execution of the translated code block from the point it "branched out" to the external or remote instructions.

As indicated at block 260, optionally, some embodiments may further optimize or analyze the translated code block, for example, to detect and handle misaligned data access, which may occur after completing the above operations, or after a hot block is translated. For example, in one embodiment, misaligned data access may appear after a relatively optimized translated code is generated. In some embodiments, this result may be eliminated, handled, avoided or mitigated, for example, using further optimization operations, which may be used in conjunction with the detection and handling operations indicated at block 250, or at another suitable time. For example, during the operations indicated at block 250, it may be detected that although an instruction does not produce or cause a misaligned data access event, the instruction is a potential candidate to result in misaligned data access during execution. Such instruction may be referred to as a "candidate instruction". Identification, detection, classification, registration and/or evaluation of a candidate instruction may be performed, for example, in relation to one or more suitable criteria or conditions, e.g., the type of the instruction, an estimated probability that the instruction will result in a misaligned data access, or a detection of a significant probability that the instruction will result in a misaligned data access.

In accordance with some embodiments of the invention, the operations indicated at block 260 may optionally include, for example, upon detection of a candidate instruction, performing an instrumentation on the candidate instruction. If a misaligned data access is detected using the instrumentation used, then the translated block may be discarded. Additionally, the method may register an indication that when the original code block is translated, substantially all candidate instructions in the original code block may be translated in a way that detects and handles misaligned data access, e.g., using Code 1 or any other suitable code sequence. The registered indication may be stored, for example, in translator 150, memory unit 142 and/or storage unit 143. In some embodiments, the indication may relate not only to the candidate instruction, but also to substantially all the instructions of the type of the candidate instruction. Upon translation of the original code block, the registered indication may be detected or tracked, and accordingly, substantially all candidate instructions in the original code block, or all instructions of the type of a candidate instruction in the original code block, may be translated in a way that detects and handles misaligned data access, e.g., using Code 1 or any other suitable code sequence.

In some embodiments, one or more of the operations described above, e.g., the data misalignment detection and handling operations of block 240, the code modification described with reference to block 240, or the optimization operations of block 260, may be performed by one or more suitable software and/or hardware components. For example, in some embodiments, code modification may be performed by translator 150, or by a module or a component external to translator 150. In one embodiment, modification of a code may be performed, for example, by modifying translator 150 or by modifying another suitable component or module, whose modification may result a code modification. Similarly, detection and/or handling of data misalignment may be performed by translator 150, or by one or more modules which may be internal or external to translator 150.

In some embodiments of the invention, one or more of the operations described above, e.g., the translation operations of block 210, the light instrumentation operations of block 220, the data misalignment check of block 230, the heavy instrumentation operations of block 240, the data misalignment detection and handling operations of block 250, the optimization operations of block 260, or other suitable operations, may be repeated, or may be performed more than once or in various orders of operation. Furthermore, in some embodiments, as a result of one or more of these operations, a translated code block may be discarded, deleted, replaced, inspected, analyzed, modified, optimized, re-generated, re-produced, or re-translated. As indicated at block 270, after performing one or more or all of the above operations, or several iterations or repetitions of one or more of the above operations, the resulting translated code block may be kept and used, or may be registered as a translated code block which may be kept and used.

Embodiments of the invention may allow various benefits. For example, in some embodiments, data misalignment detection and handling may significantly decrease processing time and/or processing time, or may significantly improve performance. In one embodiment, for example, a workload that requires about 1,236 seconds to complete without data misalignment detection and handling, may require only about 133 seconds to complete using data misalignment detection and handling in accordance with an embodiment of the invention. Some embodiments of the invention may allow various other benefits, in addition to or instead of the benefits described.

Some embodiments of the invention may be implemented, for example, using a machine-readable medium or article which may store an instruction or a set of instructions that, if executed by a machine, for example, by computing platform 110, by processor 141, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 142), memory device, memory article, memory medium, storage device, storage article, storage medium and/or storage unit (e.g., storage unit 143), for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors, or devices as are known in the art. Some embodiments of the invention may include buffers, registers, storage units and/or memory units, for temporary or long-term storage of data or in order to facilitate the operation of a specific embodiment.

While certain features of the invention have been illustrated and described herein, many modifications, substitutions, changes, and/or equivalents may occur to those skilled in the art. It is, therefore, to be understood that the appended claims are intended to cover all such modifications and/or changes.

What is claimed is:

1. A method comprising:
    during translation of a code block in a system comprising a hardware processor from a first format suitable for a first computing platform to a second format suitable for a second computing platform, inserting one or more instructions in said code block to detect whether execution of said code block results in a misaligned data access prior to execution of said code block;
    storing a location of a first memory address in a tracking list for storing the location of memory addresses for which misaligned data access is detected if accessing the first memory address by a first instruction results in the misaligned data access;
    adding one or more instructions to the first instruction;
    checking the tracking list to determine if a location of a second memory address is identical to the location of the first memory address when a second instruction requires access to the second memory address; and
    obviating the need to add instructions to the second instruction if the location of the second memory address accessed by the second instruction is identical to the location of the first memory address.

2. The method of claim 1 wherein detecting comprises inserting at least one instruction in said code block to detect a location of an instruction whose execution results in the misaligned data access.

3. The method of claim 1, wherein inserting one or more instructions in said code block comprises inserting at least one instruction in said code block to detect a location of an instruction whose execution results in the misaligned data access.

4. The method of claim 1, wherein adding comprises adding to said code block an instruction to branch an execution of said code block to a code sequence whose execution handles the misaligned data access.

5. The method of claim 1, comprising modifying said code block to handle misaligned data access in a subsequent execution of said code block.

6. The method of claim 1, further comprising translating said code block from said first format to said second format.

7. The method of claim 1, wherein inserting one or more instructions in said code block further comprises inserting one or more instructions in said code block to detect whether execution of said code block results in the misaligned data access prior to execution of a code block translated from a format suitable for a 32-bit based computing platform to a format suitable for a 64-bit based computing platform.

8. An appratus comprising:
    a hardware processor to insert one or more instructions, during translation of a code block from a first format suitable for a first computing platform to a second format suitable for a second computing platform, in said code block to detect whether execution of said code block results in misaligned data access prior to execution of said code block, to store a location of a first memory address in a tracking list for storing the location of memory addresses for which misaligned data access is detected if accessing the first memory address by a first instruction results in the misaligned data access; to add one or more instructions to the first instruction; to check the tracking list to determine if a location of a second memory address is identical to the location of the first memory address when a second instruction requires access to the second memory address; and to obviate the need to add instructions to the second instruction if the location of the second memory address accessed by the second instruction is identical to the location of the first memory address.

9. The apparatus of claim 8 wherein the processor is able to insert at least one instruction in said code block to detect a location of an instruction whose execution results in the misaligned data access.

10. The apparatus of claim 8, wherein the processor is able to add to said code block an instruction to branch an execution of said code block to a code sequence whose execution handles the misaligned data access.

11. The apparatus of claim 8, wherein the processor is able to modify said code block to handle misaligned data access in a subsequent execution of said code block.

12. The apparatus of claim 8, wherein the processor is able to, before insertion, translate said code block from said first format to said second format.

13. The apparatus of claim 8, wherein the first computing platform is a 32-bit based computing platform and the second computer architecture is a 64-bit based computing platform.

14. A computing platform comprising:
   a hardware processor to insert one or more instructions, during translation of a code block from a first format suitable for a first computing platform to a second format suitable for a second computing platform, in said code block to detect whether execution of said code block results in misaligned data access prior to execution of said code block; to store a location of a first memory address in a tracking list for storing the location of memory addresses for which misaligned data access is detected if accessing the first memory address by a first instruction results in the misaligned data access; to add one or more instructions to the first instruction; to
   check the tracking list to determine if a location of a second memory address is identical to the location of the first memory address when a second instruction requires access to the second memory address; and to obviate the need to add instructions to the second instruction if the location of the second memory address accessed by the second instruction is identical to the location of the first memory address; and
   a dynamic random access memory operably associated with said processor to store at least a portion of said code block.

15. The apparatus of claim 14 wherein the processor is able to insert at least one instruction of said code block to detect whether execution of said code block results in the misaligned data access.

16. The computing platform of claim 14, wherein the processor is able to insert at least one instruction in said code block to detect a location of an instruction whose execution results in the misaligned data access.

17. A machine-readable medium having stored thereon a set of instructions that, if executed by a machine, cause the machine to perform a method comprising:

during translation of a code block from a first format suitable for a first computing platform to a second format suitable for a second computing platform, inserting one or more instructions in said code block to detect whether execution of said code block results in the misaligned data access prior to execution of said code block;

storing a location of a first memory address in a tracking list for storing the location of memory addresses for which misaligned data is detected if accessing the first memory address by a first instruction results in the misaligned data access;

adding one or more instructions to the first instruction;

checking the tracking list to determine if a location of a second memory address is identical to the location of the first memory address when a second instruction requires access to the second memory address; and obviating the need to add instructions to the second instruction if the location of the second memory address accessed by the second instruction is identical to the location of the first memory address.

18. The machine-readable medium of claim 17 wherein the instructions that result in detecting result in insertion of at least one instruction in said code block to detect a location of an instruction whose execution results in the misaligned data access.

19. The machine-readable medium of claim 17, wherein the instructions that result in insertion resulting in insertion of at least one instruction in said code block to detect a location of an instruction whose execution results in the misaligned data access.

20. The machine-readable medium of claim 17, wherein the instructions comprise at least part of a translator.

21. The machine-readable medium of claim 17, wherein the instructions comprise at least part of an execution layer.

22. The machine-readable medium of claim 17, wherein the instructions comprise at least part of an operating system.

23. The machine-readable medium of claim 17, wherein the instructions comprise at least part of a compiler.

24. The method of claim 1, wherein the location of the second memory address is identical to the location of the first memory address if the size of the difference between the first and second memory addresses is the same as the size of the data misalignment or is a factor of the size of the data misalignment.

25. The apparatus of claim 8, wherein the location of the second memory address is identical to the location of the first memory address if the size of the difference between the first and second memory addresses is the same as the size of the data misalignment or is a factor of the size of the data misalignment.

26. The apparatus of claim 14, wherein to location of the second memory address is identical to the location of the first memory address if the size of the difference between the first and second memory addresses is the same as the size of the data misalignment or is a factor of the size of the data misalignment.

27. The machine-readable medium of claim 17, wherein the location of the second memory address is identical to the location of the first memory address if the size of the difference between the first and second memory addresses is the same as the size of the data misalignment or is a factor of the size of the data misalignment.

* * * * *